United States Patent
Lin et al.

(10) Patent No.: US 10,863,521 B1
(45) Date of Patent: Dec. 8, 2020

(54) BROADCAST RECEIVER CONTROL METHOD AND APPARATUS, AND MOBILE TERMINAL

(71) Applicant: GUANGDONG OPPO MOBILE TELECOMMUNICATIONS CORP., LTD., Guangdong (CN)

(72) Inventors: Zhiyong Lin, Guangdong (CN); Runsheng Pei, Guangdong (CN); Liangjing Fu, Guangdong (CN); Ruyu Wu, Guangdong (CN); Jun Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/492,537

(22) PCT Filed: Mar. 9, 2018

(86) PCT No.: PCT/CN2018/078562
§ 371 (c)(1),
(2) Date: Sep. 9, 2019

(87) PCT Pub. No.: WO2018/161955
PCT Pub. Date: Sep. 13, 2018

(30) Foreign Application Priority Data

Mar. 10, 2017 (CN) .......................... 2017 1 0140681

(51) Int. Cl.
*H04W 4/00* (2018.01)
*H04W 72/08* (2009.01)
(Continued)

(52) U.S. Cl.
CPC ......... *H04W 72/082* (2013.01); *H04W 4/029* (2018.02); *H04W 72/005* (2013.01)

(58) Field of Classification Search
None
See application file for complete search history.

(56) References Cited

U.S. PATENT DOCUMENTS

| 10,635,510 B2* | 4/2020 | Huang ............... G06F 9/542 |
| 2010/0222081 A1* | 9/2010 | Ward ................. G01S 5/021 |
| | | 455/456.3 |

(Continued)

FOREIGN PATENT DOCUMENTS

| CN | 1258154 C | 5/2006 |
| CN | 103595547 A | 2/2014 |

(Continued)

OTHER PUBLICATIONS

International Search Report (ISR) and Written Opinion (WO) dated May 30, 2018 for Application No. PCT/CN2018/078562.

(Continued)

*Primary Examiner* — Phirin Sam
(74) *Attorney, Agent, or Firm* — Ladas & Parry LLP

(57) ABSTRACT

A broadcast receiver control method and apparatus and a mobile terminal are provided. The method includes: acquiring at least one broadcast type that a first application subscribes, during registration, to receive; judging whether the at least one broadcast type includes a preset broadcast type; determining, in response to the judgment that the at least one broadcast type includes the preset broadcast type, the first application as an illegally registered broadcast application; acquiring a receiver queue of a target broadcast; and performing optimal control on the receiver queue according to the determined illegally registered broadcast application.

8 Claims, 5 Drawing Sheets

(51) Int. Cl.
*H04W 72/00* (2009.01)
*H04W 4/029* (2018.01)

(56) References Cited

U.S. PATENT DOCUMENTS

| | | | |
|---|---|---|---|
| 2012/0076198 A1* | 3/2012 | Hong | H04N 21/2383 375/240.01 |
| 2013/0304869 A1 | 11/2013 | Gupta et al. | |
| 2014/0129644 A1 | 5/2014 | Mohan et al. | |
| 2015/0004958 A1* | 1/2015 | Wang | H04W 4/08 455/418 |
| 2015/0301921 A1 | 10/2015 | Kumar et al. | |
| 2015/0350409 A1* | 12/2015 | Tuukkanen | H04M 1/72572 455/456.2 |
| 2016/0241890 A1* | 8/2016 | Park | H04N 21/20 |
| 2016/0323170 A1* | 11/2016 | Hu | H04L 12/1886 |
| 2016/0352793 A1* | 12/2016 | Lee | H04L 65/4084 |

FOREIGN PATENT DOCUMENTS

| | | |
|---|---|---|
| CN | 103823699 A | 5/2014 |
| CN | 103973875 A | 8/2014 |
| CN | 105159433 A | 12/2015 |
| CN | 105335654 A | 2/2016 |
| CN | 106201738 A | 12/2016 |
| CN | 106201740 A | 12/2016 |
| CN | 106936994 A | 7/2017 |

OTHER PUBLICATIONS

Quan Gan et al: "The Research of Android Broadcast Intercept Technology Based on Priority", Multimedia Information Networking and Security(MINES), 2012 Fourth International Conference on, IEEE, Nov. 2, 2012(Nov. 2, 2012), pp. 556-559, XP032303533.
Extended European Search Report for the EP patent application No. 18764924.9, dated Nov. 19, 2019.

* cited by examiner

BROADCAST RECEIVER CONTROL METHOD AND APPARATUS, AND MOBILE TERMINAL

CROSS-REFERENCE TO RELATED APPLICATIONS

The present disclosure is a national stage application of International Patent Application No. PCT/CN2018/078562, which is filed on Mar. 9, 2018 and claims benefit to Chinese Patent Application No. 201710140681.5, filed on Mar. 10, 2017 and entitled "Broadcast Receiver Control Method and Apparatus, and Mobile Terminal", the contents of which are hereby incorporated by reference in its entirety.

TECHNICAL FIELD

The present disclosure relates to the technical field of electronic device applications and, for example, to a broadcast receiver control method and apparatus, and a mobile terminal.

BACKGROUND

With the rapid development of the Internet and smart terminals, various Applications (APPs) have been developed and installed on smart terminals. However, part of rogue software, acting as a broadcast receiver, performs self-starting by receiving broadcasts in the background so as to conduct improper operations.

The increase in the number of applications running in the background of a system leads to increase of the power consumption of the system and waste of system resources. In addition, simultaneous starting or activation of multiple applications leads to reduction of system performance.

SUMMARY

The embodiments of the present disclosure provide a broadcast receiver control method and apparatus, and a mobile terminal, which can improve the system performance of a mobile terminal and reduce the power consumption of a system.

According to a first aspect, the embodiments of the present disclosure provide a broadcast receiver control method, which may include that:

at least one broadcast type that a first application subscribes, during registration, to receive is acquired;

It is judged whether the at least one broadcast type includes a preset broadcast type;

the first application is determined as an illegally registered broadcast application in response to the judgment that the at least one broadcast type includes the preset broadcast type;

a receiver queue of a target broadcast is acquired; and optimal control is performed on the receiver queue according to the determined illegally registered broadcast application.

According to a second aspect, the embodiments of the present disclosure also provide a broadcast receiver control apparatus, which may include:

a broadcast type acquiring module, configured to acquire at least one broadcast type that a first application subscribes, during registration, to receive;

a preset broadcast type judging module, configured to judge whether the at least one broadcast type includes a preset broadcast type;

an illegally registered broadcast application determining module, configured to determine, in response to the judgment that the at least one broadcast type includes the preset broadcast type, the first application as an Illegally registered broadcast application;

a receiver queue acquiring module, configured to acquire a receiver queue of a target broadcast; and a receiver queue optimizing module, configured to perform optimal control on the receiver queue according to the determined illegally registered broadcast application.

According to a third aspect, the embodiments of the present disclosure further provide a mobile terminal, which may include: a memory, a processor and a computer program that is stored on the memory and runnable on the processor, wherein the computer program is executed by the processor to implement the following operations:

at least one broadcast type that a first application subscribes, during registration, to receive is acquired;

it is judged whether the at least one broadcast type includes a preset broadcast type;

the first application is determined as an illegally registered broadcast application in response to the judgment that the at least one broadcast type includes the preset broadcast type;

a receiver queue of a target broadcast is acquired; and optimal control is performed on the receiver queue according to the determined illegally registered broadcast application.

According to a fourth aspect, the embodiments of the present disclosure provide a computer readable storage medium storing a computer executable instruction. The computer executable instruction may be used to perform the above method.

The implementation of the embodiments of the present disclosure can improve the system performance of a mobile terminal and reduce the power consumption of a system.

DETAILED DESCRIPTION OF THE EMBODIMENTS

The present disclosure will be described below with reference to the accompanying drawings and embodiments.

Figure 1:
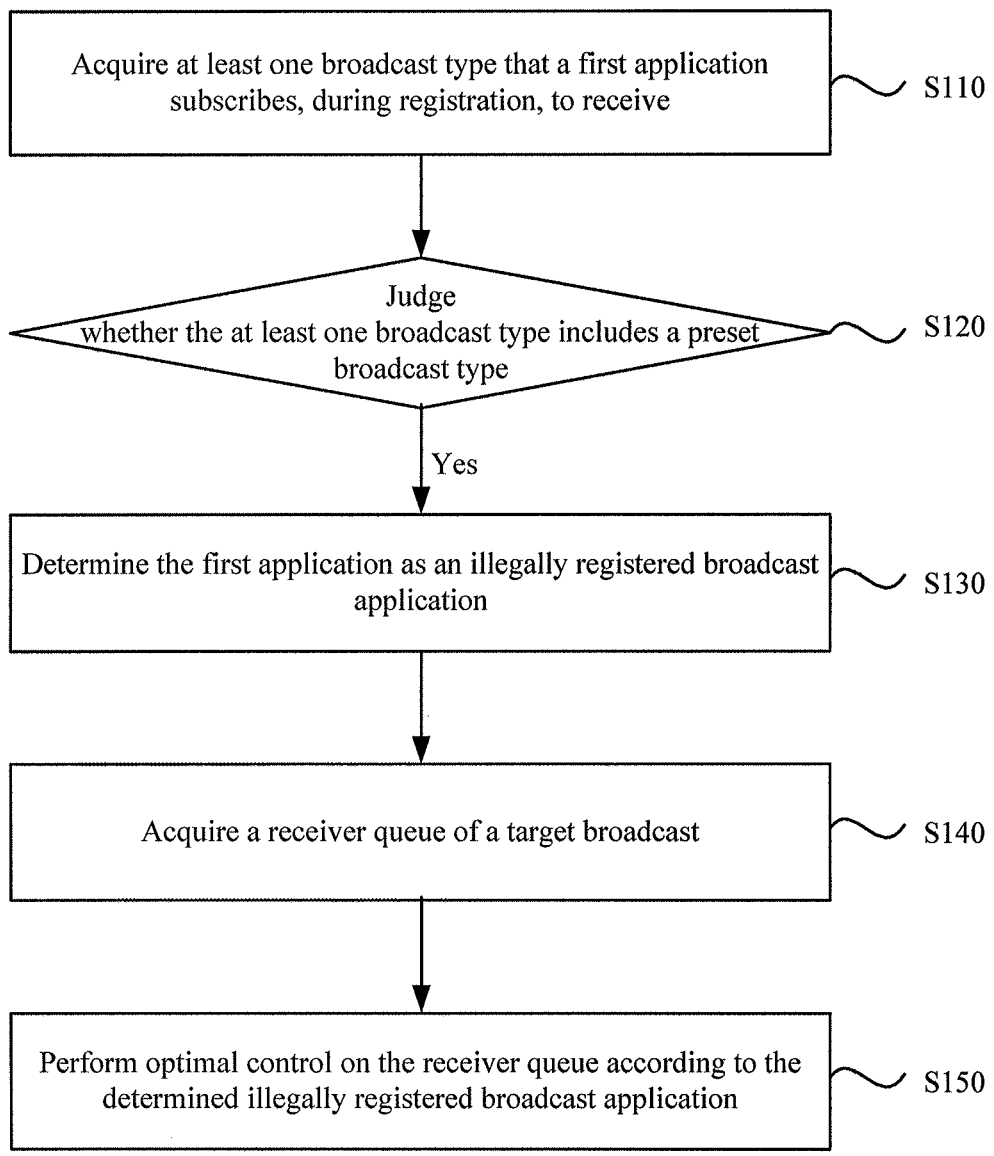
FIG. 1 is a flowchart of a broadcast receiver control method according to an embodiment of the present disclosure.

FIG. 1 is a flowchart of a broadcast receiver control method according to an embodiment of the present disclosure. The present embodiment may be applied to the case of controlling a broadcast receiver. The method may be performed by a mobile terminal, where the mobile terminal may be a smart phone, a tablet computer, or the like. As shown in FIG. 1, a broadcast receiver control method may include the following operations.

In operation 110, at least one broadcast type that a first application subscribes, during registration, to receive is acquired.

The first application may be application software installed on a mobile terminal or an APP provided by a system. For example, the application software installed on the mobile terminal may include, e.g., a WeChat client, a QQ client, a Taobao client, and an Alipay client. The APP provided by the system may include, e.g., calendars, clocks, weather, notes, and the like. The broadcast type may include a system broadcast and an application broadcast. The system broadcast may be a broadcast issued by the system, and may include a screen-on broadcast, a screen-off broadcast, an unlock broadcast, a network state change broadcast, a Bluetooth state change broadcast, a language switching broadcast, a theme switching broadcast, etc. The application broadcast may be a broadcast issued by the application software.

In the present disclosure scenario, the method for acquiring the at least one broadcast type that the first application subscribes, during registration, to receive may be implemented in the following manner. When a first application performs registration, a broadcast management module (such as ActivityManagerService) in a mobile terminal collects statistics on the broadcast types received by the first application. Different applications, when performing registration, subscribe to receive different broadcast types with different quantities. For example, Application A, when being registered, subscribes to receive 20 different types of broadcasts, and Application B, when performing registration, subscribes to receive 50 different types of broadcasts. ActivityManagerService plays the role of a broadcast center in a broadcast mechanism of the Android system, and is responsible for the registration and announcement operations of all broadcasts in the system. The registration of broadcasts refers to the process that an APP registers a broadcast receiver to ActivityManagerService. The announcement of broadcasts includes: sending, by a broadcast sender, a broadcast to ActivityManagerService; after receiving the broadcast, checking, by ActivityManagerService in its own registration center, which broadcast receivers subscribe to the broadcast, and then sending the broadcast to the broadcast receivers respectively.

In operation 120, it is judged whether the at least one broadcast type includes a preset broadcast type.

The preset broadcast type may be a broadcast type set by a user according to a usage condition of the mobile terminal or a default broadcast type of the mobile terminal in the factory setting. Exemplarily, the user needs to frequently switch languages when using the mobile terminal, so the user may set the language switching broadcast as the preset broadcast type; or if big data statistical analysis shows that the mobile terminal often needs to switch a network state, then the network state change broadcast can be set as the preset broadcast type by default before the mobile terminal is shipped from the factory. There may be one or more preset broadcast types. In the present disclosure scenario, the method for judging whether the at least one broadcast type includes the preset broadcast type may be implemented In the following manner. After the broadcast management module acquires at least one broadcast type that the first application registers to receive, the at least one broadcast type that the first application registers to receive is analyzed to judge whether the at least one broadcast type includes a preset broadcast type.

In operation 130, the first application is determined as an illegally registered broadcast application in response to the judgment that the at least one broadcast type includes the preset broadcast type.

The illegally registered broadcast application may be application software that self-starts or is activated in the background after receiving a broadcast of a preset broadcast type. The case where the at least one broadcast type includes a preset broadcast type may include the case where the at least one broadcast type includes one or more preset broadcast types. Exemplarily, if the preset broadcast type is a language switching broadcast and a network state change broadcast, and a broadcast type registered to be received by Application A includes the language switching broadcast, then Application A is determined to be an illegally registered broadcast application. If a broadcast type registered to be received by Application B includes the network state change broadcast, then Application B is determined to be an illegally registered broadcast application. If a broadcast type registered to be received by Application C includes the language switching broadcast and the network state change broadcast, then Application C is determined to be an illegally registered broadcast application.

In operation 140, a receiver queue of a target broadcast is acquired.

The target broadcast may include a system broadcast and a third-party broadcast. The receiver queue may be a queue composed of all application software receiving the target broadcast in the mobile terminal. Each target broadcast has a corresponding receiver queue. Exemplarily, Table 1 lists a correspondence between three groups of target broadcasts and their respective receiver queues.

TABLE 1

| Broadcast | Receiver queue | | | | |
|---|---|---|---|---|---|
| Broadcast 1 | Application A | Application B | Application C | Application D | Application E |
| Broadcast 2 | Application A | Application C | Application E | Application F | |
| Broadcast 3 | Application B | Application D | Application F | Application G | Application H |

In the present disclosure scenario, the process of acquiring a receiver queue of a target broadcast may be implemented in the following manner. When the broadcast management module detects that a target broadcast is to be sent, the broadcast management module, before the target broadcast is sent, identifies the type of the target broadcast, and then acquires a corresponding receiver queue according to the type of the target broadcast. Exemplarily, taking information in Table 1 as an example, if the broadcast management module detects that Broadcast 1 is to be sent, the corresponding receiver queues are acquired, according to Broadcast 1, as Application A, Application B, Application C, Application D, and Application E.

In operation 150, optimal control is performed on the receiver queue according to the determined illegally registered broadcast application.

In the present disclosure scenario, the method for performing optimal control on the receiver queue according to the determined illegally registered broadcast application may be: judging whether a number of receivers in the receiver queue is greater than a preset threshold, and in response to judging that the number of the receivers in the receiver queue is greater than the preset threshold, optimizing the receiver queue according to the determined illegally registered broadcast application. Alternatively, the method for performing optimal control on the receiver queue may be: removing the determined illegally registered broadcast application from the receiver queue. Alternatively, the method for performing optimal control on the receiver queue may be: removing an associated application having data interaction with the illegally registered broadcast application from the receiver queue. Alternatively, the method for performing optimal control on the receiver queue may be: retaining, in response to determining that the illegally registered broadcast application is present in a preset application whitelist, the illegally registered broadcast application in the receiver queue.

In the present disclosure scenario, the method for removing the determined illegally registered broadcast application from the receiver queue may be: In the case where the receiver queue includes an illegally registered broadcast application, directly deleting the illegally registered broadcast application in the receiver queue. That is, the target broadcast will not be sent to the deleted illegally registered broadcast application. Exemplarily, using Table 1 as an example, if Application E is determined as the illegally registered broadcast application in the receiver queue corresponding to Broadcast 2, Application E is deleted, that is, Broadcast 2 is not sent to Application E.

In the technical solution provided by the present embodiment, by removing the determined illegally registered broadcast application from the receiver queue, the situation that the illegally registered broadcast application self-starts or is activated in the background after receiving the target broadcast can be avoided, system resources can be saved, and the system performance can be improved.

In the present disclosure scenario, an associated application having data interaction with the illegally registered broadcast application may be removed from the receiver queue. The associated applications may be two or more applications having data interaction with each other, for example, there is data interaction between shopping application software and payment application software, and the two applications are associated applications. In the case where an associated application having data interaction with the illegally registered broadcast application is included in the receiver queue, the associated application is deleted, that is, the target broadcast is not sent to the associated application. Exemplarily, using Table 1 as an example, if Application A is determined as the illegally registered broadcast application and Application B in the receiver queue corresponding to Broadcast 3 is an associated application having data interaction with Application A, then Application B is deleted, that is, Broadcast 3 is not sent to Application B.

In the technical solution provided by the present embodiment, by removing an associated application having data interaction with the illegally registered broadcast application from the receiver queue, the situation that the illegally registered broadcast application indirectly self-starts or is activated in the background through the associated application thereof can be avoided, system resources are saved, and the system performance is improved.

In the present disclosure scenario, in response to determining that the illegally registered broadcast application is present in a preset application whitelist, the illegally registered broadcast application is retained in the receiver queue. The preset application whitelist may be a list set by a user according to his/her own actual utilization situations. For example, Application B and Application C are application software commonly used by the user, and it is not necessary to consider that Application B and Application C will occupy system resources by self-starting or activation in the background, so Application B and Application C are added to the whitelist application list. Exemplarily, using Table 1 as an example, if Application C is determined as the illegally registered broadcast application and Application C is also in a preset application whitelist, for Broadcast 2, Application C in the corresponding receiver list is not deleted, that is, Broadcast 2 is continuously sent to Application C.

In the technical solution provided by the present embodiment, in response to determining that the illegally registered broadcast application is present in a preset application whitelist, the illegally registered broadcast application is retained in the receiver queue, so the application type in the receiver queue can be flexibly controlled.

In the technical solution provided by the present embodiment, at least one broadcast type that a first application subscribes, during registration, to receive is acquired; it is judged whether the at least one broadcast type includes a preset broadcast type; the first application is determined as an illegally registered broadcast application in response to the judgment that the at least one broadcast type includes the preset broadcast type; a receiver queue of a target broadcast is acquired; and optimal control is performed on the receiver queue according to the determined llegally registered broadcast application. By judging whether a broadcast type received in the registration of an application includes a preset broadcast type, determining an illegally registered broadcast application and optimizing a receiving queue of a target broadcast according to the illegally registered broadcast application, the system performance of a mobile terminal can be improved, and the power consumption of a system can be reduced.

Figure 2:
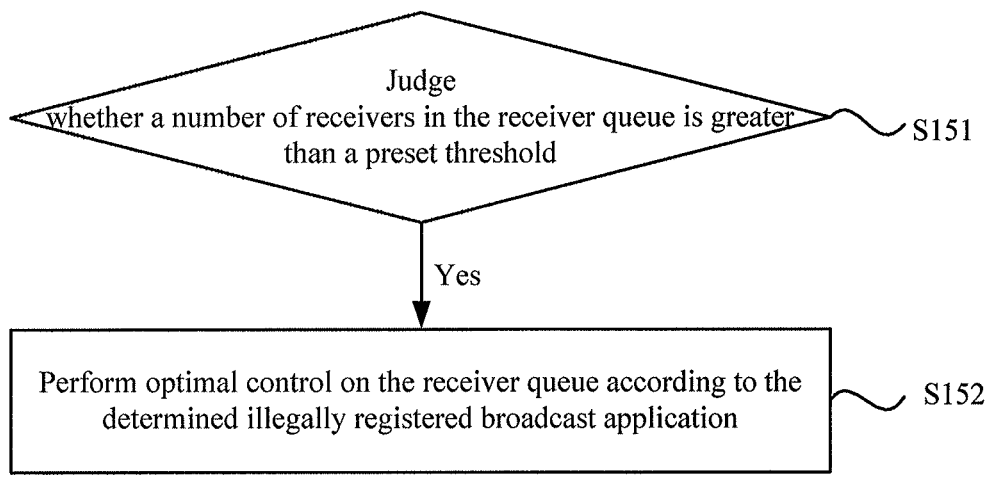
FIG. 2 is a flowchart of another broadcast receiver control method according to an embodiment of the present disclosure.

FIG. 2 is a flowchart of another broadcast receiver control method according to an embodiment of the present disclosure. As shown in FIG. 2, in an exemplary implementation, operation 150 includes the following operations.

In operation 151, it is judged whether a number of receivers in the receiver queue is greater than a preset threshold.

The preset threshold may be any positive integer within a range, e.g., a range from 50 to 100. In the present disclosure scenario, after the receiver queue of the target broadcast is acquired, the number of receivers in the receiver queue is counted, and it is judged whether the number of receivers in the receiver queue is greater than a preset value.

In operation 152, in response to judging that the number of the receivers in the receiver queue is greater than the preset threshold, optimal control is performed on the receiver queue according to the determined illegally registered broadcast application.

In the present disclosure scenario, the method for performing optimal control on the receiver queue according to the determined illegally registered broadcast application may be: removing the determined illegally registered broadcast application from the receiver queue; or removing the determined illegally registered broadcast application from the receiver queue, and removing an associated application having data interaction with the illegally registered broadcast application from the receiver queue; or removing the determined illegally registered broadcast application from the receiver queue, and retaining, in response to determining that the illegally registered broadcast application is present in a preset application whitelist, the illegally registered broadcast application in the receiver queue; or retaining, in response to determining that the illegally registered broadcast application is present in a preset application whitelist, the illegally registered broadcast application in the receiver queue.

In the technical solution provided by the present embodiment, in response to judging that the number of the receivers in the receiver queue is greater than the preset threshold, optimal control is performed on the receiver queue according to the determined illegally registered broadcast application. By controlling the number of target broadcast receivers, system resources are saved, and the system performance is improved.

Figure 3:
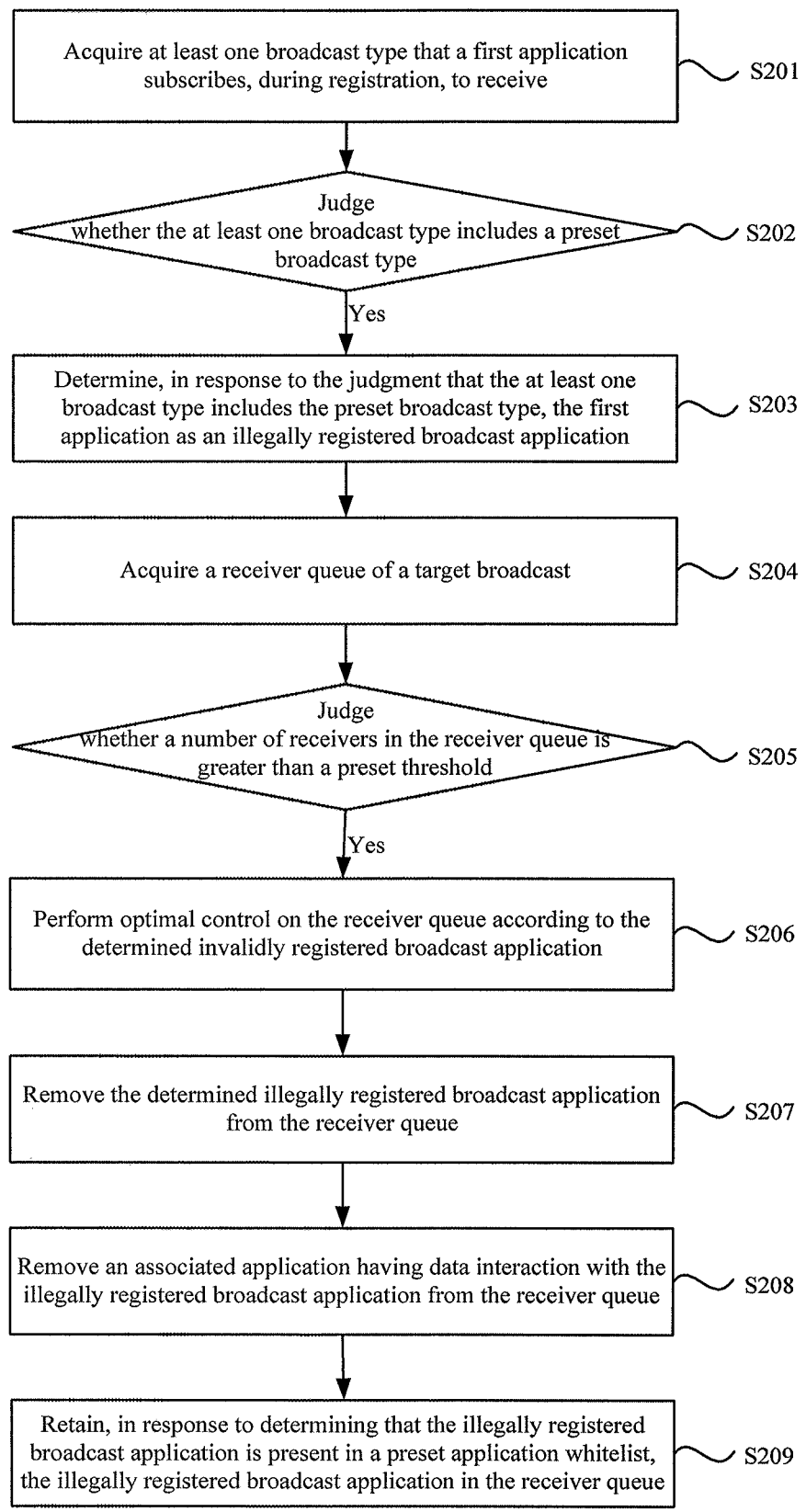
FIG. 3 is a flowchart of still another broadcast receiver control method according to an embodiment of the present disclosure.

FIG. 3 is a flowchart of still another broadcast receiver control method according to an embodiment of the present disclosure. As a further explanation of the above embodiment, the method includes the following operations: In operation 201, at least one broadcast type that a first application subscribes, during registration, to receive is acquired.

When application software is installed and registers on a mobile terminal, the application software may subscribe for reception of one or more different types of broadcasts, and a system broadcast management module acquires one or more broadcast types that an application subscribes, during registration, to receive.

In operation 202, it is judged whether the at least one broadcast type includes a preset broadcast type.

The system broadcast management module compares the acquired broadcast type with a preset broadcast type subscribed to receive at the time of registration, and judges whether at least one broadcast type that the first application subscribes, during registration, to receive includes the preset broadcast type.

In operation 203, the first application is determined as an illegally registered broadcast application in response to the judgment that the at least one broadcast type includes the preset broadcast type.

The application is determined as an illegally registered broadcast application in the case where the broadcast type that the application subscribes, during registration, to receive includes the preset broadcast type. Each application is judged at the time of registration, and all the determined illegally registered broadcast applications can be saved in an illegally registered broadcast application list for direct use in subsequent operations.

In operation 204, a receiver queue of a target broadcast is acquired.

When any one of the applications (including a third-party application and a system application) sends a broadcast, the broadcast is determined as a target broadcast. Before being sent, the target broadcast is buffered In a broadcast queue, the broadcast queue including a broadcast to be sent and a receiver queue corresponding to each broadcast In operation 205, it is judged whether a number of receivers in the receiver queue is greater than a preset threshold.

In operation 206, in response to judging that the number of the receivers in the receiver queue is greater than the preset threshold, optimal control is performed on the receiver queue according to the determined invalidly registered broadcast application.

In operation 207, the determined illegally registered broadcast application is removed from the receiver queue.

In operation 208, an associated application having data interaction with the illegally registered broadcast application is removed from the receiver queue.

In operation 209, in response to determining that the illegally registered broadcast application is present in a preset application whitelist, the illegally registered broadcast application is retained in the receiver queue.

Figure 4:
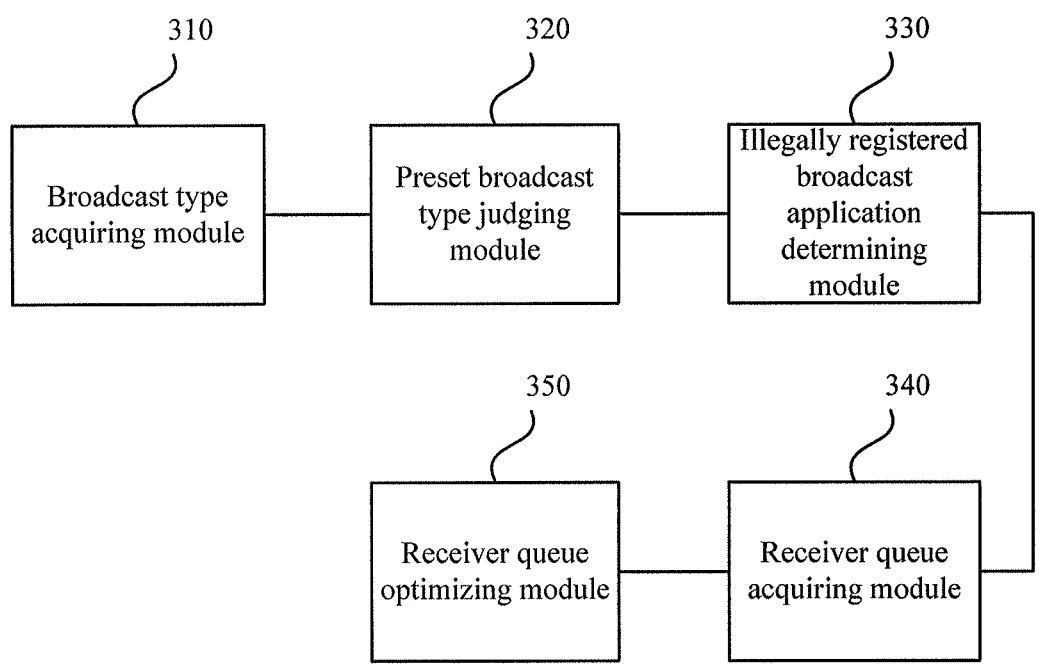
FIG. 4 is a structural diagram of a broadcast receiver control apparatus according to an embodiment of the present disclosure.

FIG. 4 is a structural diagram of a broadcast receiver control apparatus according to an embodiment of the present disclosure. As shown in FIG. 4, the broadcast receiver control apparatus includes a broadcast type acquiring module 310, a preset broadcast type judging module 320, an illegally registered broadcast application determining module 330, a receiver queue acquiring module 340, and a receiver queue optimizing module 350.

The broadcast type acquiring module 310 is configured to acquire at least one broadcast type that a first application subscribes, during registration, to receive.

The preset broadcast type judging module 320 is configured to judge whether the at least one broadcast type includes a preset broadcast type.

The illegally registered broadcast application determining module 330 is configured to determine, in response to the judgment that the at least one broadcast type includes the preset broadcast type, the first application as an ilegally registered broadcast application.

The receiver queue acquiring module 340 is configured to acquire a receiver queue of a target broadcast.

The receiver queue optimizing module 350 is configured to perform optimal control on the receiver queue according to the determined illegally registered broadcast application.

In an exemplary implementation, the receiver queue optimizing module 350 is configured to:

judge whether a number of receivers In the receiver queue is greater than a preset threshold; and perform, in response to judging that the number of the receivers in the receiver queue is greater than the preset threshold, optimal control on the receiver queue according to the determined illegally registered broadcast application.

In an exemplary implementation, the receiver queue optimizing module 350 is configured to:

remove the determined illegally registered broadcast application from the receiver queue.

In an exemplary implementation, the receiver queue optimizing module 350 is configured to:

remove an associated application having data interaction with the illegally registered broadcast application from the receiver queue.

In an exemplary implementation, the receiver queue optimizing module 350 is configured to:

retain, in response to determining that the illegally registered broadcast application is present in a preset application whitelist, the illegally registered broadcast application in the receiver queue.

The above apparatus may perform the method provided by all the foregoing embodiments of the present invention, and have the corresponding functional modules and beneficial effects for performing the above method. For technical details not fully described in the present embodiment, reference may be made to the methods provided by all of the foregoing embodiments of the present invention.

According to the technical solution provided by the present embodiment, the broadcast type acquiring module 310 acquires at least one broadcast type that a first application subscribes, during registration, to receive; the preset broadcast type judging module 320 judges whether the at least one broadcast type includes a preset broadcast type; the illegally registered broadcast application determining module 330 determines, in response to the judgment that the at least one broadcast type includes the preset broadcast type, the first application as an illegally registered broadcast application; the receiver queue acquiring module 340 acquires a receiver queue of a target broadcast; and the receiver queue optimizing module 350 optimally controls, according to the determined illegally registered broadcast application, the receiver queue. By judging whether a broadcast type received in the registration of an application includes a preset broadcast type, determining an illegally registered broadcast application and optimally controlling a receiving queue of a target broadcast according to the illegally registered broadcast application, the system performance of a mobile terminal can be improved, and the power consumption of a system can be reduced.

Figure 5:
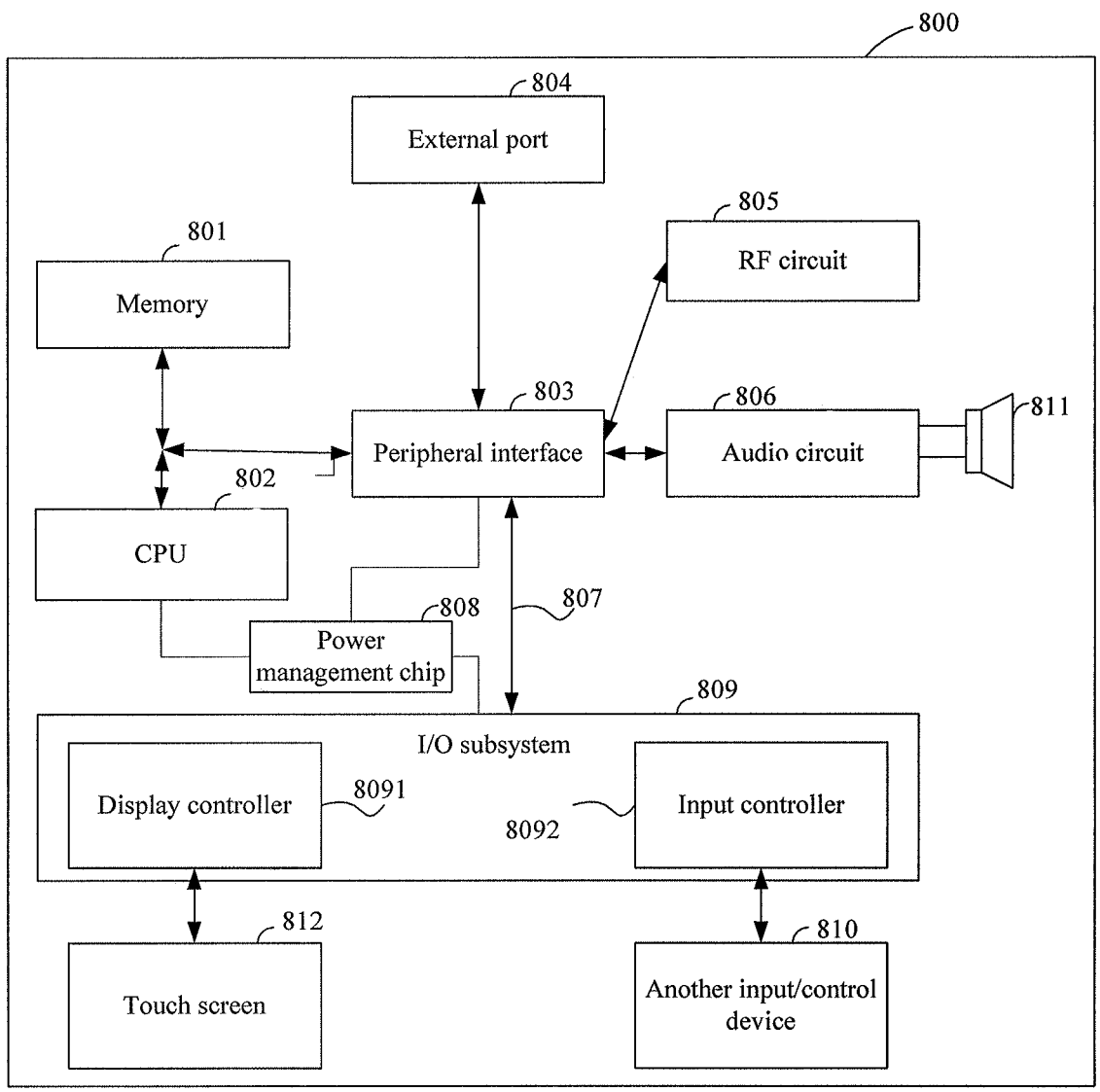
FIG. 5 is a structural diagram of a mobile terminal according to an embodiment of the present disclosure.

FIG. 5 is a structural diagram of a mobile terminal according to an embodiment of the present disclosure. As shown in FIG. 5, the mobile terminal may include: a housing (not shown), a memory 801, a Central Processing Unit (CPU) 802 (also called as a processor), a computer program that is stored on the memory 801 and is runnable on the processor 802, a circuit board (not shown), and a power circuit (not shown). The circuit board is disposed inside a space defined by the housing. The CPU 802 and the memory 801 are disposed on the circuit board. The power circuit is configured to supply power to various circuits or devices of the mobile terminal. The memory 801 is configured to store executable program codes. The CPU 802 runs programs corresponding to the executable program codes by reading the executable program codes stored in the memory 801 to perform the following operations: acquiring at least one broadcast type that a first application subscribes, during registration, to receive; judging whether the at least one broadcast type includes a preset broadcast type; determining, in response to the judgment that the at least one broadcast type includes the preset broadcast type, the first application as an illegally registered broadcast application; acquiring a receiver queue of a target broadcast; and performing optimal control on the receiver queue according to the determined illegally registered broadcast application.

The mobile terminal further includes: a peripheral interface 803, a Radio Frequency (RF) circuit 805, an audio circuit 806, a speaker 811, a power management chip 808, an Input/Output (I/O) subsystem 809, a touch screen 812, another input/control device 810 and an external port 804, and these components communicate through one or more communication buses or signal wires 807.

In an embodiment, the mobile terminal 800 shown in the figure is only an example of the mobile terminal, the mobile terminal 800 may have more or fewer components than those shown in the figure, two or more components may be combined or different component configurations may be made. Each component shown in the figure may be implemented in hardware including one or more signal processing and/or application specific integrated circuits, software or a combination of the hardware and the software.

A mobile terminal provided by the present embodiment for implementing control of a broadcast receiver will be described below in detail. For example, the mobile terminal is a mobile phone.

The memory 801: the memory 801 may be accessed by the CPU 802, the peripheral interface 803 and the like, and the memory 801 may include a high-speed Random Access Memory (RAM) and may further include a nonvolatile memory, for example, one or more disk storage devices, flash memories or other nonvolatile solid-stage storage devices.

The peripheral interface 803: the peripheral interface 803 may connect I/O peripherals of the device to the CPU 802 and the memory 801.

The I/O subsystem 809: the I/O subsystem 809 may connect the I/O peripherals of the device, for example, the touch screen 812 and the other input/control device 810 to the peripheral interface 803. The I/O subsystem 809 may include a display controller 8091 and one or more input controllers 8092 configured to control the other input/control device 810. Herein, the one or more input controllers 8092 receive electric signals from the other input/control device 810 or send electric signals to the other input/control device 810, and the other input/control device 810 may include a physical button (a pressing button and a rocker arm button), a dial, a slide switch, a joystick and a click roller. In an embodiment, the input controller 8092 may be connected with any one of a keyboard, an infrared port, a Universal Serial Bus (USB) interface and an indication device such as a mouse.

According to the working principle of a touch screen and a medium for transmitting information, the touch screen 812 may be a resistive, capacitive inductive, infrared or surface acoustic wave type. According to the installation manner, the touch screen 812 may be external, built-in or integrated. According to the technical principle, the touch screen 812 may be: a vector pressure sensing technology touch screen, a resistive technology touch screen, a capacitive technology touch screen, an infrared technology touch screen or a surface acoustic wave technology touch screen.

The touch screen 812: the touch screen 812 is an input interface and output interface between the user terminal and the user and displays visual output to the user, and the visual output may include a graph, a text, an icon, a video and the like. In an exemplary implementation, the touch screen 812 sends an electrical signal (such as an electrical signal of a contact surface) triggered by a user on the touch screen to the processor 802.

The display controller 8091 in the I/O subsystem 809 receives an electric signal from the touch screen 812 or sends an electric signal to the touch screen 812. The touch screen 812 detects a contact on the touch screen, the display controller 8091 converts the detected contact into interaction with a user interface object displayed on the touch screen 812 to implement human-computer interaction, and the user interface object displayed on the touch screen 812 may be an icon of a running game, an icon of connection to a corresponding network and the like. In an embodiment, the device may further include an optical mouse, and the optical mouse is a touch-sensitive surface which does not display visual output or an extension of a touch-sensitive surface formed by the touch screen.

The RF circuit 805 is mainly configured to establish communication between the mobile phone and a wireless network (i.e., a network side) to implement data receiving and sending between the mobile phone and the wireless network, for example, receiving and sending of a short message and an electronic mail.

The audio circuit 806 is mainly configured to receive audio data from the peripheral interface 803, convert the audio data into an electric signal and send the electric signal to the speaker 811.

The speaker 811 is configured to restore a voice signal received from the wireless network by the mobile phone through the RF circuit 805 into a sound and play the sound to the user.

The power management chip 808 is configured to perform power supply and power management on the CPU 802, the I/O subsystem and hardware connected with the peripheral interface.

In the present embodiment, the CPU 802 is configured to:
acquire at least one broadcast type that a first application subscribes, during registration, to receive;

judge whether the at least one broadcast type includes a preset broadcast type;

determine, in response to the judgment that the at least one broadcast type includes the preset broadcast type, the first application as an illegally registered broadcast application;

acquire a receiver queue of a target broadcast; and perform optimal control on the receiver queue according to the determined illegally registered broadcast application.

In an embodiment, the operation of performing optimal control on the receiver queue according to the determined illegally registered broadcast application includes that:

it is judged whether a number of receivers in the receiver queue is greater than a preset threshold; and in response to judging that the number of the receivers in the receiver queue is greater than the preset threshold, optimal control is performed on the receiver queue according to the determined illegally registered broadcast application.

In an embodiment, the operation of performing optimal control on the receiver queue according to the determined ilegally registered broadcast application includes that:

the determined illegally registered broadcast application is removed from the receiver queue.

In an embodiment, the operation of performing optimal control on the receiver queue according to the determined illegally registered broadcast application includes that:

an associated application having data interaction with the illegally registered broadcast application is removed from the receiver queue.

In an embodiment, the operation of performing optimal control on the receiver queue according to the determined illegally registered broadcast application includes that:

in response to determining that the illegally registered broadcast application is present in a preset application whitelist, the illegally registered broadcast application is retained in the receiver queue.

In an embodiment, the mobile terminal may further include a camera, a Bluetooth module, and the like, and details are not described herein.

The present embodiment also provides a computer readable storage medium storing a computer executable instruction. The computer executable instruction is used to perform the above method.

INDUSTRIAL APPLICABILITY

The present disclosure can improve the system performance of a mobile terminal and reduce the power consumption of a system.

What is claimed is:

1. A broadcast receiver control method, comprising:
acquiring at least one broadcast type that a first application registers to receive;
judging whether the at least one broadcast type comprises a preset broadcast type;
determining, in response to judging that the at least one broadcast type comprises the preset broadcast type, the first application as an illegally registered broadcast application;
acquiring a receiver queue of a target broadcast; and
performing optimization on the receiver queue according to the determined illegally registered broadcast application, wherein performing optimization on the receiver queue according to the determined illegally registered broadcast application comprises: removing the determined illegally registered broadcast application from the receiver queue; or, removing an associated application having data interaction with the illegally registered broadcast application from the receiver queue.

2. The broadcast receiver control method as claimed in claim 1, wherein performing optimization on the receiver queue according to the determined illegally registered broadcast application comprises:
judging whether a number of receivers in the receiver queue is greater than a preset threshold; and
performing, in response to judging that the number of the receivers in the receiver queue is greater than the preset threshold, optimization on the receiver queue according to the determined illegally registered broadcast application.

3. The broadcast receiver control method as claimed in claim 2, wherein performing optimization on the receiver queue according to the determined illegally registered broadcast application comprises:
retaining, in response to determining that the illegally registered broadcast application is present in a preset application whitelist, the illegally registered broadcast application in the receiver queue.

4. The broadcast receiver control method as claimed in claim 1, wherein performing optimization on the receiver queue according to the determined illegally registered broadcast application comprises:
retaining, in response to determining that the illegally registered broadcast application is present in a preset application whitelist, the illegally registered broadcast application in the receiver queue.

5. A mobile terminal, comprising a memory, a processor and a computer program that is stored on the memory and runnable on the processor, wherein the computer program is executed by the processor to implement the following operations:
acquiring at least one broadcast type that a first application registers to receive;
judging whether the at least one broadcast type comprises a preset broadcast type;
determining, in response to judging that the at least one broadcast type comprises the preset broadcast type, the first application as an illegally registered broadcast application;
acquiring a receiver queue of a target broadcast; and
performing optimization on the receiver queue according to the determined illegally registered broadcast application, wherein performing optimization on the receiver queue according to the determined illegally registered broadcast application comprises: removing the determined illegally registered broadcast application from the receiver queue; or, removing an associated application having data interaction with the illegally registered broadcast application from the receiver queue.

6. The mobile terminal as claimed in claim 5, wherein performing optimization on the receiver queue according to the determined illegally registered broadcast application comprises:
judging whether a number of receivers in the receiver queue is greater than a preset threshold; and
performing, in response to judging that the number of the receivers in the receiver queue is greater than the preset threshold, optimization on the receiver queue according to the determined illegally registered broadcast application.

7. The mobile terminal as claimed in claim 6, wherein performing optimization on the receiver queue according to the determined illegally registered broadcast application comprises:
    retaining, in response to determining that the illegally registered broadcast application is present in a preset application whitelist, the illegally registered broadcast application in the receiver queue.

8. The mobile terminal as claimed in claim 5, wherein performing optimization on the receiver queue according to the determined illegally registered broadcast application comprises:
    retaining, in response to determining that the illegally registered broadcast application is present in a preset application whitelist, the illegally registered broadcast application in the receiver queue.

\* \* \* \* \*

UNITED STATES PATENT AND TRADEMARK OFFICE
CERTIFICATE OF CORRECTION

PATENT NO. : 10,863,521 B1  
APPLICATION NO. : 16/492537  
DATED : December 8, 2020  
INVENTOR(S) : Zhiyong Lin et al.

Page 1 of 1

It is certified that error appears in the above-identified patent and that said Letters Patent is hereby corrected as shown below:

On the Title Page

Item (71) Applicant delete:  
"Guangdong (CN)"  
Insert:  
--Dongguan, Guangdong (CN)--

Item (73) Assignee delete:  
"Guangdong (CN)"  
Insert:  
--Dongguan, Guangdong (CN)--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*